(12) United States Patent
Kazemi et al.

(10) Patent No.: US 8,564,916 B2
(45) Date of Patent: Oct. 22, 2013

(54) PHOTOVOLTAIC ARRAY GROUND FAULT DETECTION METHOD FOR UTILITY-SCALE GROUNDED SOLAR ELECTRIC POWER GENERATING SYSTEMS

(75) Inventors: Hossein Kazemi, San Francisco, CA (US); Viggo Selchau-Hansen, Dover, MA (US); Brian Hinman, Los Gatos, CA (US)

(73) Assignee: Western Gas and Electric Company, Thousand Oaks, CA (US)

( * ) Notice: Subject to any disclaimer, the term of this patent is extended or adjusted under 35 U.S.C. 154(b) by 70 days.

(21) Appl. No.: 13/028,152

(22) Filed: Feb. 15, 2011

(65) Prior Publication Data
US 2011/0199707 A1    Aug. 18, 2011

Related U.S. Application Data

(60) Provisional application No. 61/338,313, filed on Feb. 16, 2010, provisional application No. 61/424,537, filed on Dec. 17, 2010, provisional application No. 61/370,001, filed on Aug. 2, 2010, provisional application No. 61/343,070, filed on Apr. 23, 2010.

(51) Int. Cl.
*H02H 3/16* (2006.01)

(52) U.S. Cl.
USPC ............................................. 361/47

(58) Field of Classification Search
USPC .................................... 361/42, 47
See application file for complete search history.

(56) References Cited

U.S. PATENT DOCUMENTS

| | | | |
|---|---|---|---|
| 3,721,862 A * | 3/1973 | Brennen et al. | 361/44 |
| 6,111,732 A * | 8/2000 | Beland | 361/42 |
| 6,856,497 B2 * | 2/2005 | Suzui et al. | 361/42 |
| 6,930,868 B2 * | 8/2005 | Kondo et al. | 361/42 |
| 7,561,017 B2 * | 7/2009 | Darr et al. | 337/79 |
| 2007/0189045 A1 * | 8/2007 | Gritter | 363/40 |
| 2009/0021014 A1 * | 1/2009 | Letas | 290/44 |
| 2009/0032082 A1 * | 2/2009 | Gilmore et al. | 136/244 |
| 2009/0315404 A1 * | 12/2009 | Cramer et al. | 307/82 |

OTHER PUBLICATIONS

Wiles, John, "Photovoltaic Power Systems and the 2005 National Electrical Code: Suggested Practices", Oct. 4, 2007.*

* cited by examiner

*Primary Examiner* — Jared Fureman
*Assistant Examiner* — Kevin J Comber
(74) *Attorney, Agent, or Firm* — Rutan & Tucker, LLP (57) ABSTRACT

Various methods and apparatus are described for a photovoltaic system. In an embodiment, a hybrid grounding circuit as well as a ground fault monitoring circuit are in the inverter circuitry with its switching devices that generate three-phase Alternating Current (AC) voltage. The three-phase AC voltage is supplied to a utility power grid interface transformer, where a primary-side common node of the Utility Power grid interface transformer is connected to Earth ground. Each inverter has 1) its own set of isolation contacts to connect as well as isolate this particular inverter from the utility grid interface transformer, and 2) control components in the ground fault monitoring circuit for controlling operation of the isolation contacts based off a presence of the ground fault detected by the ground fault monitor circuit for that inverter. The inverter circuit receives a DC voltage supplied from its own set of ungrounded Concentrated PhotoVoltaic modules.

15 Claims, 9 Drawing Sheets

A. Inverter Circuit Arrangement

Figure 5  Three-Substring Implementation of Grounded Substring Concept

Figure 6  Paddle/300 Volt Substring Wiring Arrangement

FIG 7  Representative Tracker Arrangement

Table 1. Available vs. Required Input Voltage Data

| | Units | US | | EU | |
|---|---|---|---|---|---|
| Grid voltage (3 phase) | Vac | 480 | | 400 | |
| String voltage safety limit | Vdc | +/- 600 | | +/-1000 | |
| Solar cell type | | Si | MJ GsAs | Si | MJ GsAs |
| Vmp(not) from bipolar string conforming to Voc safety limit | Vdc | 593 | 905 | 988 | 1508 |
| Sine-triangle PWM into high grid | | | | | |
| Minimum input voltage required | Vdc | 896 | 896 | 750 | 750 |
| Single-stage inversion possible? | | No | Marginal | Yes | Yes |
| SVM inverter into high grid | | | | | |
| Minimum input voltage required | Vdc | 779 | 779 | 652 | 652 |
| Single-stage inversion possible? | | No | Yes | Yes | Yes |

Figure 8

PHOTOVOLTAIC ARRAY GROUND FAULT DETECTION METHOD FOR UTILITY-SCALE GROUNDED SOLAR ELECTRIC POWER GENERATING SYSTEMS

RELATED APPLICATIONS

This application is a continuation in part of the following and claims the benefit of and priority under 35 USC 119(e) to U.S. Provisional Application titled "SINGLE STAGE DC-TO-AC CONVERSION FOR HIGH EFFICIENCY OPERATION OF CONCENTRATING PHOTOVOLTAIC SYSTEMS" filed on Feb. 16, 2010 having application Ser. No. 61/338,313 and U.S. Provisional Application titled "INTEGRATED ELECTRONICS SYSTEM" filed on Dec. 17, 2010 having application Ser. No. 61/424,537, and U.S. Provisional Application titled "PHOTOVOLTAIC ARRAY GROUND FAULT DETECTION METHOD FOR UTILITY-SCALE GROUNDED SOLAR ELECTRIC POWER GENERATING SYSTEMS" filed on Aug. 2, 2010 having application Ser. No. 61/370,001, and U.S. Provisional Application titled "SOLAR CELL SUBSTRING GROUNDING TO MANAGE INVERTER INPUT VOLTAGE" filed on Apr. 23, 2010 having application Ser. No. 61/343,070.

NOTICE OF COPYRIGHT

A portion of the disclosure of this patent document contains material that is subject to copyright protection. The copyright owner has no objection to the facsimile reproduction by anyone of the interconnect as it appears in the Patent and Trademark Office patent file or records, but otherwise reserves all copyright rights whatsoever.

FIELD

In general, a photovoltaic system having a hybrid grounding circuit as well as a ground fault monitoring circuit is discussed.

BACKGROUND

Two methods have been used in the past to convert DC for a solar array in AC voltage. A DC-DC boost converter can be used to increase the string voltage enough for a sine-triangle PWM inversion. Alternatively, a transformer can be used after the inverter circuit to step up the inverter output. Either solution adds cost and reduces efficiency and reliability.

SUMMARY

Various methods and apparatus are described for a photovoltaic system. In an embodiment, a hybrid grounding circuit as well as a ground fault monitoring circuit are in the inverter circuitry with its switching devices that generate three-phase Alternating Current (AC) voltage. The three-phase AC voltage is supplied to a utility power grid interface transformer, where a primary-side common node of the Utility Power grid interface transformer is connected to Earth ground. Each inverter has 1) its own set of isolation contacts to connect as well as isolate this particular inverter from the utility grid interface transformer, and 2) control components in the ground fault monitoring circuit for controlling operation of the isolation contacts based off a presence of the ground fault detected by the ground fault monitor circuit for that inverter. The inverter circuit receives a DC voltage supplied from its own set of ungrounded Concentrated PhotoVoltaic (CPV) modules.

BRIEF DESCRIPTION OF THE DRAWINGS

The multiple drawings refer to the embodiments of the invention.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific voltages, named components, connections, types of circuits, etc., in order to provide a thorough understanding of the present invention. It will be apparent, however, to one skilled in the art that the present invention may be practiced without these specific details. In other instances, well known components or methods have not been described in detail but rather in a block diagram in order to avoid unnecessarily obscuring the present invention. Further specific numeric references such as a first inverter, may be made. However, the specific numeric reference should not be interpreted as a literal sequential order but rather interpreted that the first inverter is different than a second inverter. Thus, the specific details set forth are merely exemplary. The specific details may be varied from and still be contemplated to be within the spirit and scope of the present invention. The specific details may be varied from and still be contemplated to be within the spirit and scope of the present invention.

In general, various methods and apparatus associated with a hybrid grounding circuit as well as a ground fault monitoring circuit for a photovoltaic system are discussed. In an embodiment, the inverter circuitry has a hybrid grounding circuit as well as a ground fault monitoring circuit. The inverter circuitry also has switching devices that generate three-phase AC voltage that is supplied to a utility power grid interface transformer. A primary-side common node of the Utility Power grid interface transformer is connected to Earth ground and forms a portion of the hybrid grounding circuit. Each inverter has 1) its own set of isolation contacts to connect as well as isolate this particular inverter from the utility grid interface transformer, and 2) control components in the ground fault monitoring circuit for controlling operation of the isolation contacts based off a presence of the ground fault detected by the ground fault monitor circuit for that inverter. Each inverter has an input circuit that temporarily grounds the inverter and its CPV modules. The inverter circuit receives a DC voltage supplied from its own set of ungrounded CPV modules.

Figure 1:
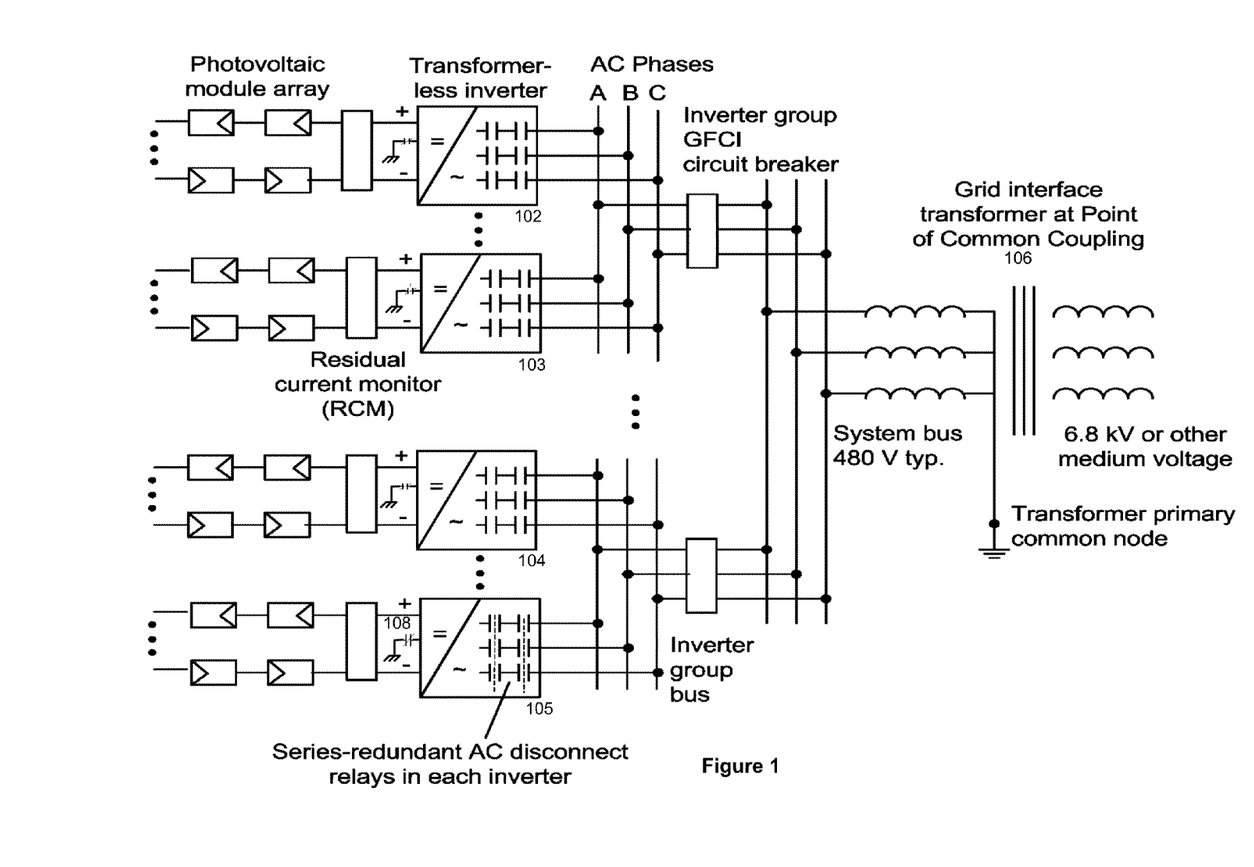
FIG. 1 illustrates a diagram of an embodiment of an ungrounded photovoltaic system feeding a hybrid grounding circuit as well as a ground fault monitoring circuit for inverter circuitry with switching devices that generate three-phase Alternating Current (AC) voltage supplied to a utility power grid interface transformer.

FIG. 1 illustrates a diagram of an embodiment of an ungrounded photovoltaic system feeding a hybrid grounding circuit as well as a ground fault monitoring circuit for inverter circuitry with switching devices that generate three-phase Alternating Current (AC) voltage supplied to a utility power grid interface transformer.

This is a "grounded" system using transformer-less inverter circuits 102-105, typically generating 480 V 3-phase power, in which 1) the primary side common node of the Utility Power grid interface transformer 106 is connected to Earth ground during the operation of the inverter in this hybrid grounding circuit and 2) referenced to Earth ground by a switching device, such as a first grounding switching device 108, in the input circuit of the inverter prior to the bridge arranged switching devices of the inverter producing three phase AC power. Each inverter circuit 102-105 receives a DC voltage supplied from its own set of ungrounded Concentrated PhotoVoltaic (CPV) modules.

A utility-scale photovoltaic (PV) solar electrical power generating system may have a large number of inverters, such as a first through a fourth inverter circuit 102-105, that feed into a common grid-interface transformer 106 as shown in FIG. 1. The multiple solar arrays, each with their one or more inverter circuits, directly couple their three phase AC output to the same utility grid transformer 106. Thus, the inverter circuitry uses a Space Vector Modulated bridge switches, typically generating 480 V AC three phase power, that directly couple to the utility power grid transformer, without connection through an isolation transformer and then to the utility grid transformer, in where a neutral wire of the primary side of the utility power grid interface transformer is referenced to Earth ground.

Each inverter circuit 102-105 features series-redundant AC disconnect contactors that disconnect the inverter from the grid feed based on conditions sensed by the inverter controller. Thus, each inverter has its own set of isolation contacts to connect as well as isolate this particular inverter from the utility grid transformer 106, control components in the ground fault monitoring circuit, such as control logic and a set point, for controlling operation of the isolation contacts, based off a presence of the ground fault detected by the ground fault monitor circuit for that inverter.

Each inverter circuit in the grounded system has its own ground fault monitoring circuit. The ground fault monitoring circuit detects the presence of the ground fault via a change in 1) voltage, 2) current or 3) both and the detection method occurs via a differential sense method. The input of each ground fault monitoring circuit can be equipped with a residual current monitor (RCM). The residual current monitor senses the unbalanced ("residual") current condition between the positive and negative leads of the PV module array caused by current leakage from the array, and signals the inverter controller to disconnect the inverter from the grid feed if the residual current level indicates a hazardous condition. In additional embodiments, the sensing of an open fuse in the input can indicate the presence of a ground fault as well.

The grounded solar electric generating system may employ additional devices to disconnect and/or shut down individual inverters with ground faults for safety reasons or to prevent shut down of the whole solar system. Inverter groups (or less-commonly, individual inverters) are interfaced to a facility bus via ground-fault circuit interrupt (GFCI) breakers. If a ground-fault circuit interrupt breaker senses asymmetrical power flow in the AC phases, it disconnects the inverter group (or single inverter) from the facility grid.

Figure 2A:
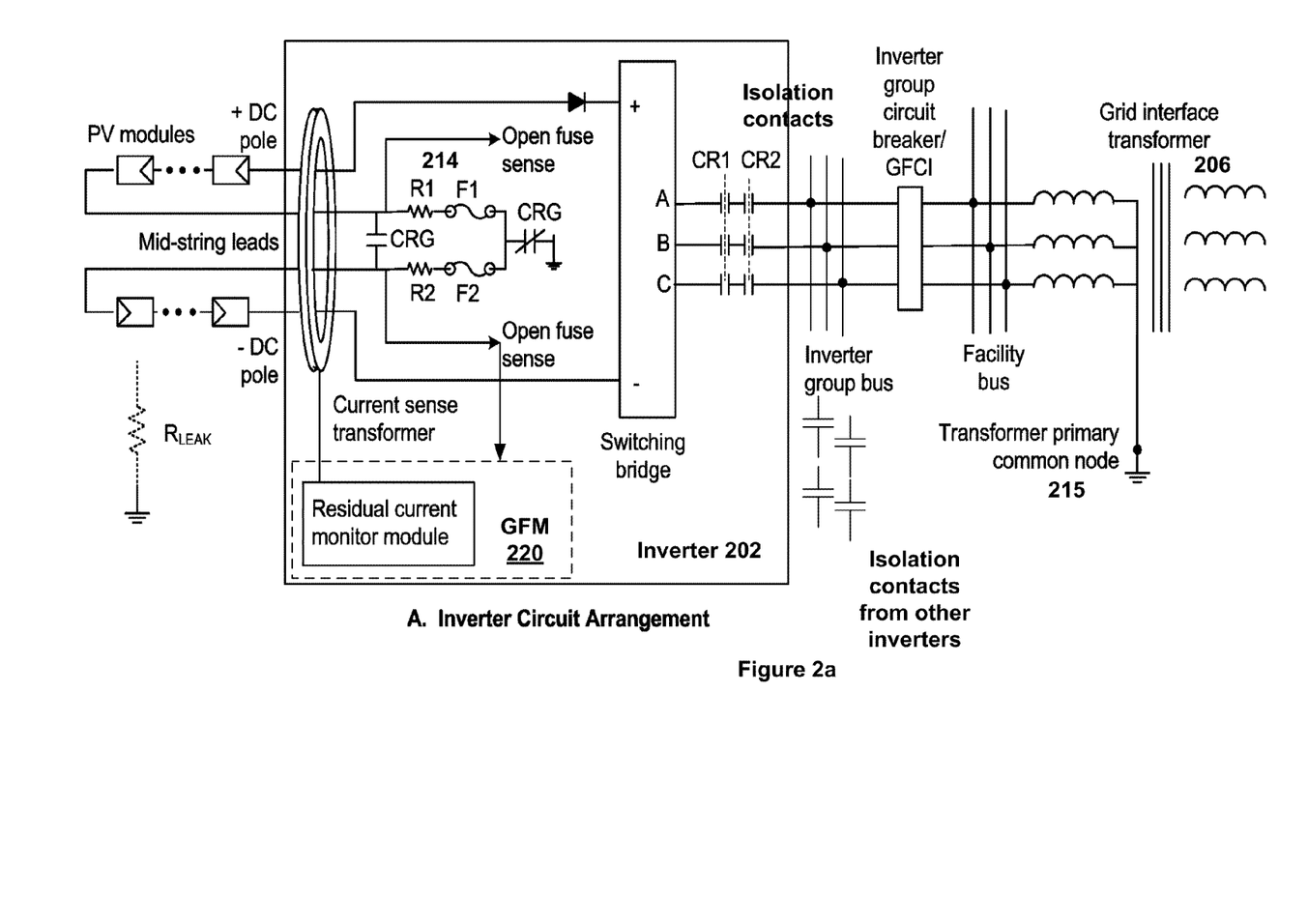
FIGS. 2a and 2b illustrate a diagram of an embodiment of a hybrid grounding circuit and a ground fault monitoring circuit in the inverter circuitry that generates AC voltage from the DC supplied from the CPV solar array.
Figure 2B:
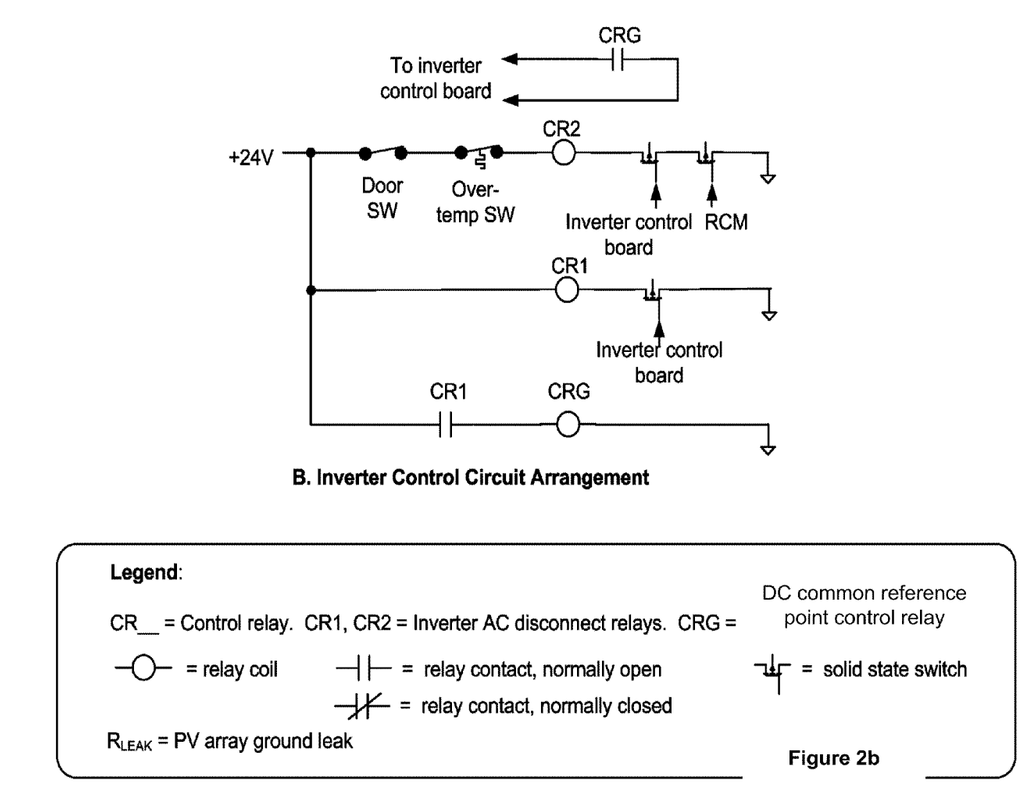

FIGS. 2a and 2b illustrate a diagram of an embodiment of a hybrid grounding circuit and a ground fault monitoring circuit in the inverter circuitry that generates AC voltage from the DC supplied from the CPV solar array.

Referring to FIG. 2a, the series of CPV modules in the solar array is arranged as two substrings that are connected to the inverter. The inverter circuit receives a bipolar DC voltage, + and −600 VDC, supplied from its own set of CPV modules.

When an inverter is connected to the system bus, its CPV module array must be floating (ungrounded) to prevent a ground loop path between the solar array and grid interface transformer primary 206. Nevertheless, the inverter switching action maintains the midpoint of the series-connected PV module array near ground potential.

The hybrid grounding circuit maintains the CPV array at a safe voltage while the isolation contacts of the inverter circuit open to disconnect from the grid. In typical systems, when an inverter is turned off and disconnected from the grid while its CPV array remains illuminated, then the voltages at the PV poles depend on the ground leakage resistance balance along the array, with the result that the voltage at one pole with respect to ground may exceed a regulatory safety limit. However, the hybrid grounding circuit maintains the midpoints of the DC arrays at Earth ground prior to the isolation contacts of the inverter circuit closing and the switching devices of the inverter producing three phase AC. The hybrid grounding circuit includes an input DC grounding circuit 214 located in each inverter circuit that electrically couples to a string of CPV cells from the solar array and the primary-side common node 215 of the Utility Power grid interface transformer connected to Earth ground. The electrical components in the input DC grounding circuit 214 cause the DC power from that strings of CPV cells to be connected to Earth ground when the inverter circuit is not producing three phase AC power out. The electrical components in the input DC grounding circuit 214 may include 1) one or more switching devices, such as a contact, transistor, FET, or similar device, one or more load resistors, and one or more overcurrent devices such as 1) fuse, 2) circuit breaker or 3) a combination of both. The voltage from the CPV modules forming the solar array is referenced to Earth ground via the one or more contacts, one or more resistors, and one or more fuses when the inverter logic is off and when powered but not producing three phase AC voltage. The electrical components in the input DC grounding circuit 214 may also include 1) a contact 2) switch or 3) both to create a dynamic ground/common zero Volts DC reference point for the bipolar DC voltage supplied to that inverter from its set of CPV modules. The switching device may actuate, A) by electrically opening a contact or switch, B) electrically by closing a contact or switch, C) by the switching device starting to conduct, and D) by any combination of the three, to create an electrical path.

Referring to both FIGS. 2a and 2b, in an example, the 'PV array DC common reference point and grounding' control relay CRG is de-energized while the inverter is turned off. The hybrid grounding circuit 214 in the inverter circuit has the DC common reference point and grounding control relay actuate one or more contacts, such as normally open contact CRG, to create a common DC reference point for a bipolar DC voltage input from the CPV modules of a solar array while the inverter circuit is turned off. The DC common reference point and grounding control relay also actuates one or more contacts, such as normally closed contact CRG, to create connect the array to Earth ground while the inverter circuit is turned off, and also while the inverter logic is powered but the inverter circuit is disconnected from the grid and not operating. For clarity, the PV array midpoints connect to Earth ground also via the resistors and fuses in the electrical path with the normally closed contact CRG as shown. In these conditions, the inverter bridge switches are open, resulting in an electrical open circuit at each CPV array pole, and consequently, no current flows in the CPV solar array even if well-illuminated by sunlight because a complete ground path cannot be established. However, the midpoints of the ungrounded CPV array are maintained at Earth ground potential.

When a ground fault on the arrays is not present, a complete electrical path from the positive or negative voltage of the CPV modules to Earth ground and back up to CPV modules cannot be established. The ground fault monitoring circuit 220 detects when a ground leak occurs in the CPV modules. For example, a ground current will flow through the CPV modules, ground fault resistance RLEAK, load resistor R1, fuse F1, and the normally closed contact CRG completing the ground path between the normally ungrounded CPV modules and Earth ground. With the ground fault current flowing, the ground fault monitoring circuit 220 can detect the presence of the ground fault on the ungrounded CPV array. In addition, should the fault current exceed the fuse rating it will open and interrupt the fault current. The voltage will now be sensed on the open sense input legs of a voltage differential sense circuit (see FIG. 3 for an example differential sense circuit).

When the 'PV array DC common reference point and grounding' control relay CRG is energized, the normally open contact connects the substrings together while the normally closed contact releases the grounded node. The switching device in the input of the inverter circuit, this normally open contact, creates the DC common reference point for the positive VDC and the negative VDC inputs from the PV array. The ground fault monitoring circuit 220 can localize the ground fault to a specific set of CPV modules feeding a specific inverter circuit by when the detected ground fault voltage has a negative voltage component, then the ground fault is coming from the set of CPV modules supplying the negative DC voltage; and likewise when the detected ground fault voltage has a positive voltage component, then the ground fault is coming from the set of CPV modules supplying the positive DC voltage.

In addition, the DC sensitive residual current monitor at the inverter input can detect PV array ground leakage prior to the inverter being connected to the grid feed, which may prevents a safety hazard, equipment damage, or the disconnection of an inverter group by its ground-fault circuit interrupt senses breaker. The latter outcome if not prevented could cause both loss of revenue while the inverter group is off-line, and potentially large maintenance costs to locate the ground fault to a particular PV array. The residual current monitor (RCM) monitors residual currents coming from the PV arrays and issues a signal when these currents exceed a defined value. The set point for the DC fault current of the residual current monitor is set so DC current injection is not considered a ground fault current.

The ground fault detection circuit 220 senses a CPV array ground fault before the inverter is put into operation so that the inverter can be left disconnected. The ground fault detection circuit also disconnects a single CPV array and its inverter with a ground fault without shutting down the entire system supplying power to the grid interface transformer. The signal is sent out from the ground fault detection circuit 220 to open only this inverter circuit isolation contacts CR1 and CR2.

The ground fault voltage and current detection occurs via a differential sense and fuse method. The ground fault monitoring circuit 220 may contain a DC imbalance sensing circuit to assist in fault protection in determining which set of CPV modules supplying power to the common utility grid transformer has a ground fault both 1) prior to inverter start up and 2) during the inverter circuit operation while producing the three phase AC voltage.

Figure 3:
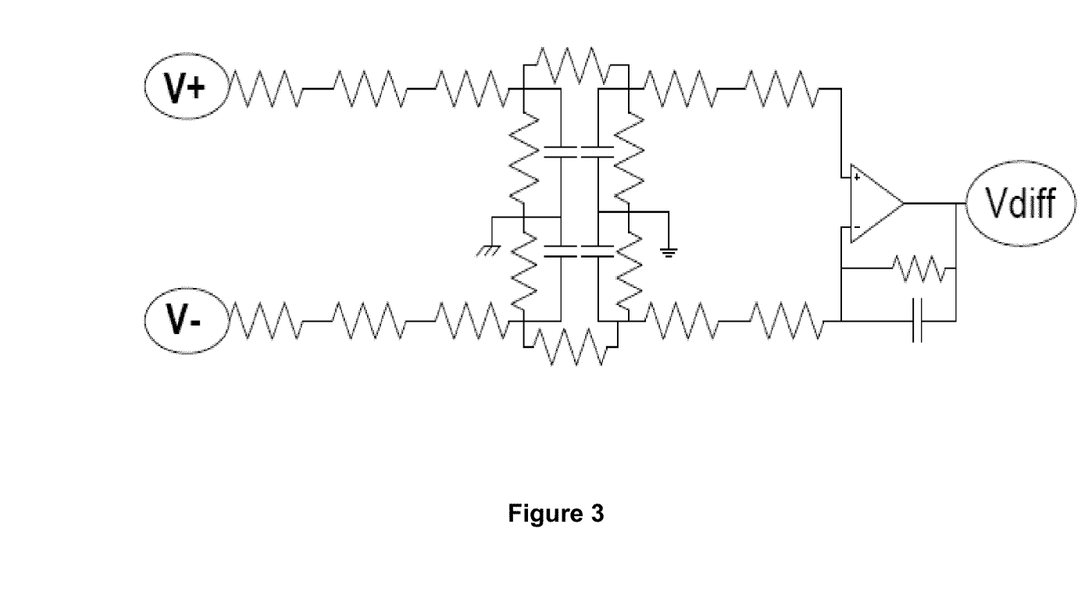
FIG. 3 illustrates a diagram of an embodiment of a voltage differential sense circuit to sense an open fuse.

The voltage differential sense circuit to sense an open fuse is shown in FIG. 3.

Referring to FIGS. 2a and 2b, in an embodiment of the ground fault detection circuit 220, should a ground leak, symbolized by RLEAK, occur somewhere along the substring, a ground current will flow through RLEAK, load resistor R1, and fuse F1 according to the number of photocells between RLEAK and load resistor R1, their I-V (current-voltage) characteristics, and the intensity of solar illumination on these cells. Should the fault current exceed the fuse rating it will open and interrupt the fault current. The voltage will now be sensed on the open sense input legs. The same logic applies to the lower substring.

The ground fault monitoring circuit 220 detects when the inverter is scheduled to put be on-line, the inverter controller interrogates the open fuse sense lines and when the inverter controller senses any voltage between the two open fuse sense lines, a fuse has opened, indicating a ground fault in the CPV solar arrays, and the inverter controller keeps the inverter circuit off-line by keeping the isolation contacts open. The controller keeps the inverter off-line with the CR1 and CR2 relays de-energized. When the ground fault monitoring circuit detects no fuse failure, the inverter controller puts the inverter on-line with the grid by closing the isolation contacts, and also energizes the 'PV array DC common reference point and ground' control relay CRG to interconnect and float the CPV array DC voltage midpoints. Now, the system ground is now established by the system transformer common being connected to Earth ground, and the residual current monitor is now active and responsive to future CPV array ground leaks. When a ground occurs in a CPV array, the ground fault is sensed by the associated residual current monitor, and the solar array with the ground fault and its inverter circuit are isolated by actuation of the isolation contacts from the utility grid transformer but the transformer continues to receiver AC voltage from the other inverter circuits coupling to that transformer and continues to produce power.

Figure 4:
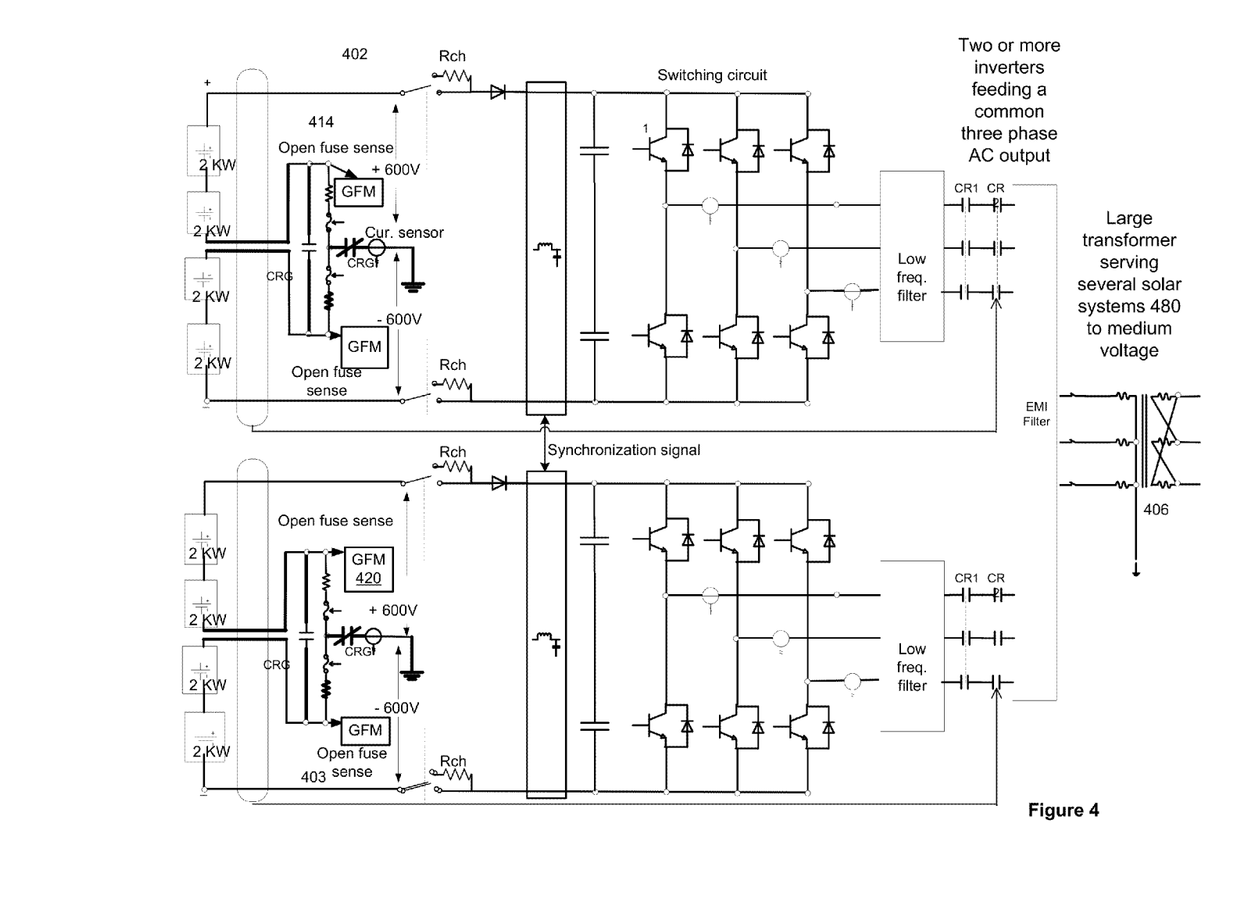
FIG. 4 illustrates a diagram of an embodiment of two inverters from the same array having their own isolation contacts and supplying power to a common grid transformer.

FIG. 4 illustrates a diagram of an embodiment of two inverters from the same array having their own isolation contacts and supplying power to a common grid transformer.

Each inverter circuit 402, 403 receives it portion of the bipolar DC voltage supplied from its own set of CPV modules. The first inverter 402 receives a positive DC voltage, such as +600 VDC, and the second inverter 403 receives a −600 VDC.

The ground fault voltage and current detection still occurs via a differential sense method. Each grounded inverter system has its own ground fault monitoring circuit such as a first ground fault monitoring circuit 420.

The Ground fault monitoring circuit is configured to detect PV array ground leakage before the inverter is connected to the grid feed, which prevents disconnecting the entire system due to the grounded PV array. The hybrid grounding circuit in the inverter circuit uses relays to maintain the set of CPV modules from the solar array at a safe voltage while the inverter circuit is disconnected from the grid by connecting a DC output of the set of CPV modules feeding that inverter through a switching device to an Earth ground. The PV array ground faults that occur while the inverter is off or are present when the inverter is scheduled to be put on-line are sensed prior to inverter operation, and the inverter is kept off-line. The ground fault monitoring circuit is configured to detect PV array ground leakage before the isolation contacts of the inverter circuit connect to the utility power grid interface transformer, which prevents disconnecting all of the inverter circuits in the entire system due to a ground fault on a single set of CPV modules.

The isolation contacts and control components of the ground fault monitoring circuit are configured to prevent the 1) disconnection of the entire solar power generating system or 2) disconnection of an inverter group from the utility power grid interface transformer due to a ground fault occurring in an individual inverter circuit or its associated CPV modules, by a localization of the ground fault to 1) a specific inverter circuit from an inverter group coupling to the utility grid power transformer or 2) even more specifically, a specific set of CPV modules feeding a specific inverter circuit, which also reduce corrective maintenance costs.

Each inverter has its own set of isolation contacts to isolate this particular inverter from the utility grid transformer, a control components such as relay and set point for controlling operation of the isolation contact, based off the fault current detected by the ground fault monitor for that inverter.

Like FIG. 1, multiple solar arrays, now each with their two or more inverters, directly couple their three phase AC output to the same utility grid transformer.

The hybrid grounding circuit when in operation producing AC, the inverter circuit gets referenced to the neutral potential on the primary side common node of the Utility Power grid interface transformer, and when the inverter circuit is not in operation, then an input circuit of the inverter circuit connects through a switching device, such as a contact, to Earth ground. A switching device may actuate, by electrically opening a contact or switch, closing a contact or switch, by the first switching device starting to conduct, and any combination of the three, to create an electrical path.

The Ground fault monitoring circuit assists in fault protection in determining which solar array supplying power to the common utility grid transformer has a ground fault prior to inverter start up and during the inverter operation.

In such a system, the PV modules and associated DC wiring are not isolated from the inverter output and therefore carry hazardous voltages. The ground fault monitoring circuit is configured to detect the presence of the ground fault in the ungrounded CPV modules that supply Direct Current (DC) power to grounded inverter circuit.

Figure 6:
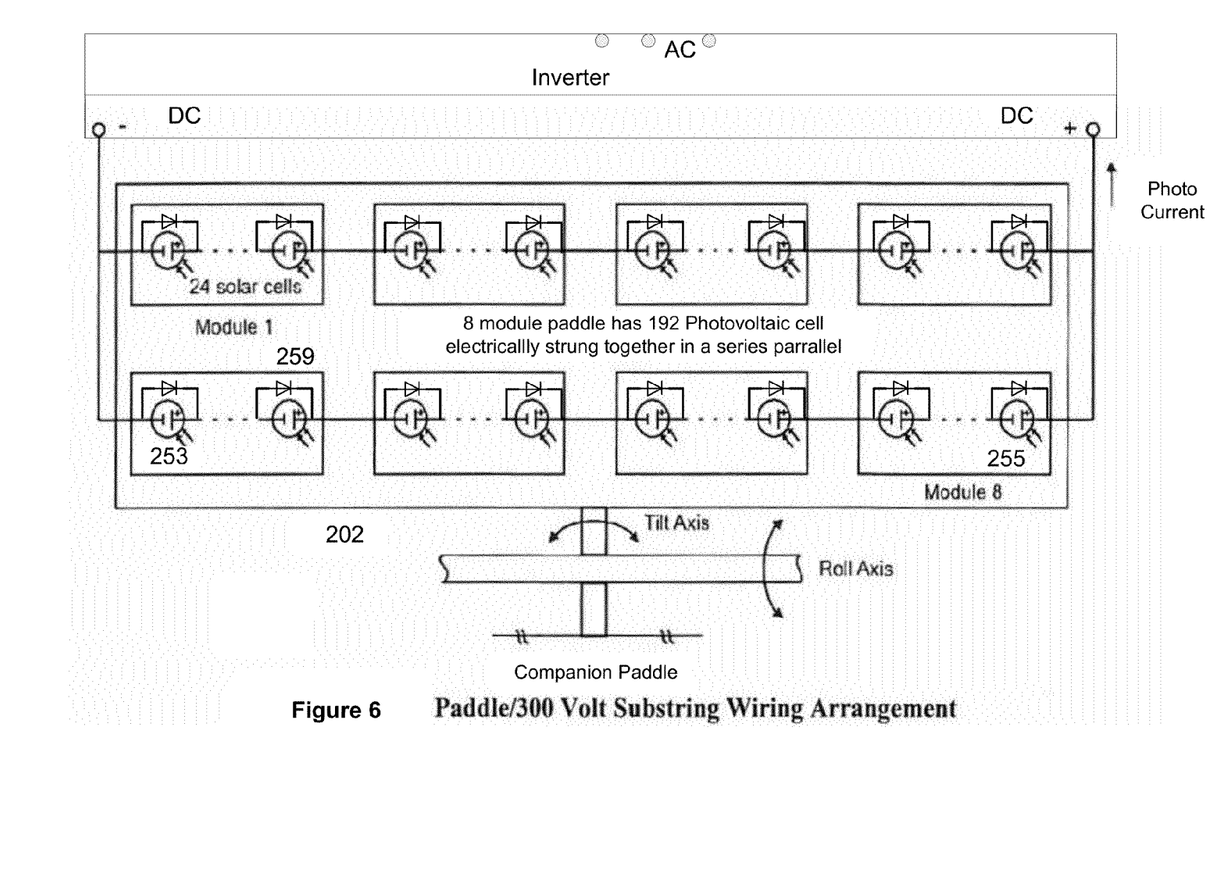
FIG. 6 illustrates a diagram of an embodiment of a string of CPV modules and their CPV cells supplying power to an inverter circuit.

A Method of Solar Cell Substring Grounding to Manage Inverter Input Voltage for PV Applications FIG. 6 illustrates a diagram of an embodiment of a string of CPV modules and their CPV cells supplying power to an inverter circuit. The most economical and reliable means of converting the DC output of a series-wired string of solar cells is to operate the string into a single-stage DC-AC inverter. However, a string that conforms to the safety code for maximum voltage may not provide sufficient voltage for single-stage inversion to AC grid power. In some embodiments, this technique allows the use of longer, higher-voltage strings without violating safety requirements so that single-stage inversion can be used with a wider variety of solar cells and AC grid voltages.

Briefly, in order to obtain the maximum power converter input voltage within safety limits, a series-string of solar cells is typically grounded at its midpoint (FIG. 1) so that no point of the string exceeds +/−600 Vdc (US) or +/−1000 Vdc (EU) with respect to utility ground. This creates a bipolar string. The string voltage must conform to these limits under all conditions. Table 1 shows Vmp (hot) for Si and MJ GaAs cell strings whose Voc (cold) are at the US and EU safety limits. The table also shows the minimum string voltage required for several types of single-stage pulse width modulated (PWM) inverters to operate into both US and EU power grids.

The solar cell string voltage behavior is as follows:

The highest voltage occurs at the extreme low temperature that the plant will experience with the string unloaded (inverter off), such that each cell is producing its open-circuit voltage, Voc. Call the resulting string voltage Voc (cold).

The lowest voltage occurs at the extreme high cell operating temperature when the string is loaded for maximum power extraction. Here, each cell is operating near its maximum power voltage, Vmp. Call the resulting string voltage Vmp (hot).

Both Voc and Vmp for a string decrease when various cells are not illuminated (panel shading) or have failed in fail-open mode (bypassed by diode) or in fail-short mode.

Figure 8:
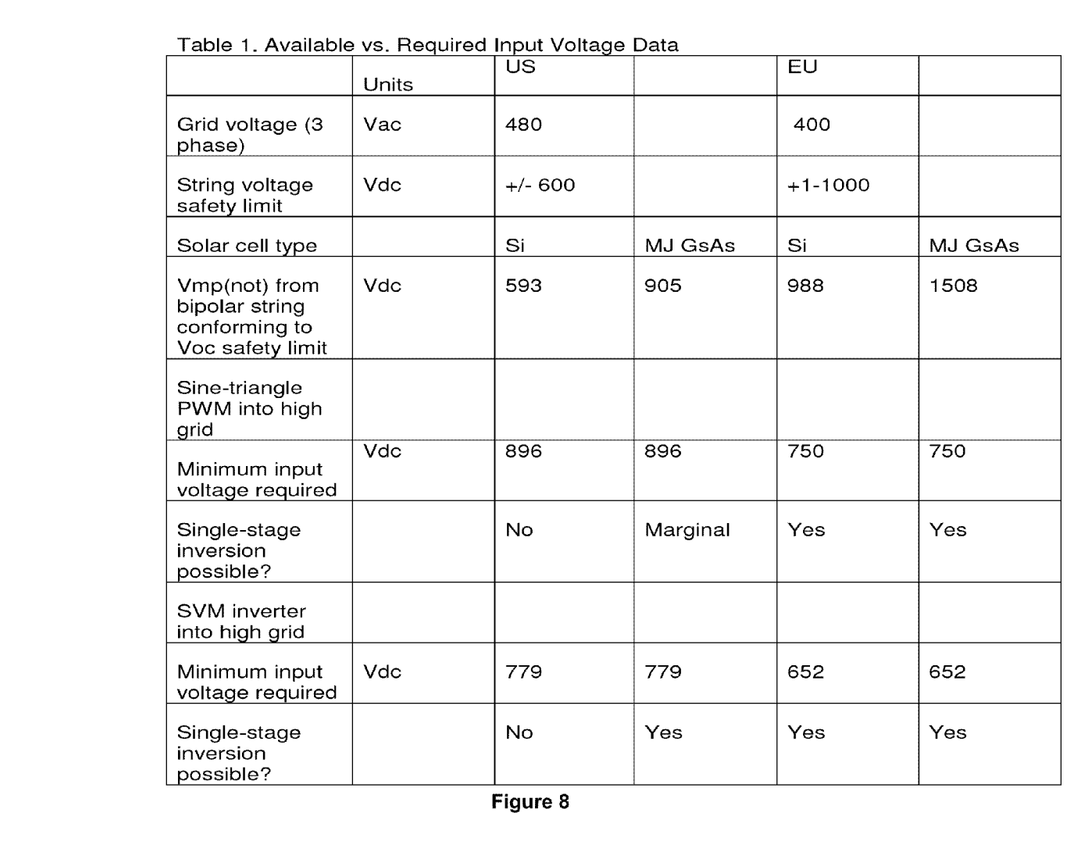
FIG. 8 illustrates a table of an embodiment of available verses required DC input voltage from a string of CPV modules.

Typical silicon solar cells have relatively low fill factor (essentially the ratio of Vmp to Voc) compared with multi-junction (MJ) GaAs cells used in CPV applications. The difference in fill factor has significant implications. Table 1 shows Vmp (hot) for Si and MJ GaAs cell strings whose Voc (cold) are at the US and EU safety limits. FIG. 8 illustrates a table of an embodiment of available verses required DC input voltage from a string of CPV modules.

This system uses space vector modulation (SVM) inversion since it requires some 15% lower input voltage to operate into a given grid voltage. For US applications, a single-stage SVM inverter requires more input voltage than is available from a safety-compliant silicon cell string, but has a 905−779=126 Vdc margin when powered by a safety-compliant MJ GaAs string. However, this margin is eroded as cells in the string are shaded or fail. A bipolar string may comprises 360 MJ GaAs cells from 15 panels (modules), and the margin is erased if more than about 1.5 panels are shaded. Therefore, a means of obtaining higher solar cell string operating voltages will allow a plant to produce power under adverse illumination conditions and with more tolerance for solar cell failures.

Figure 5:
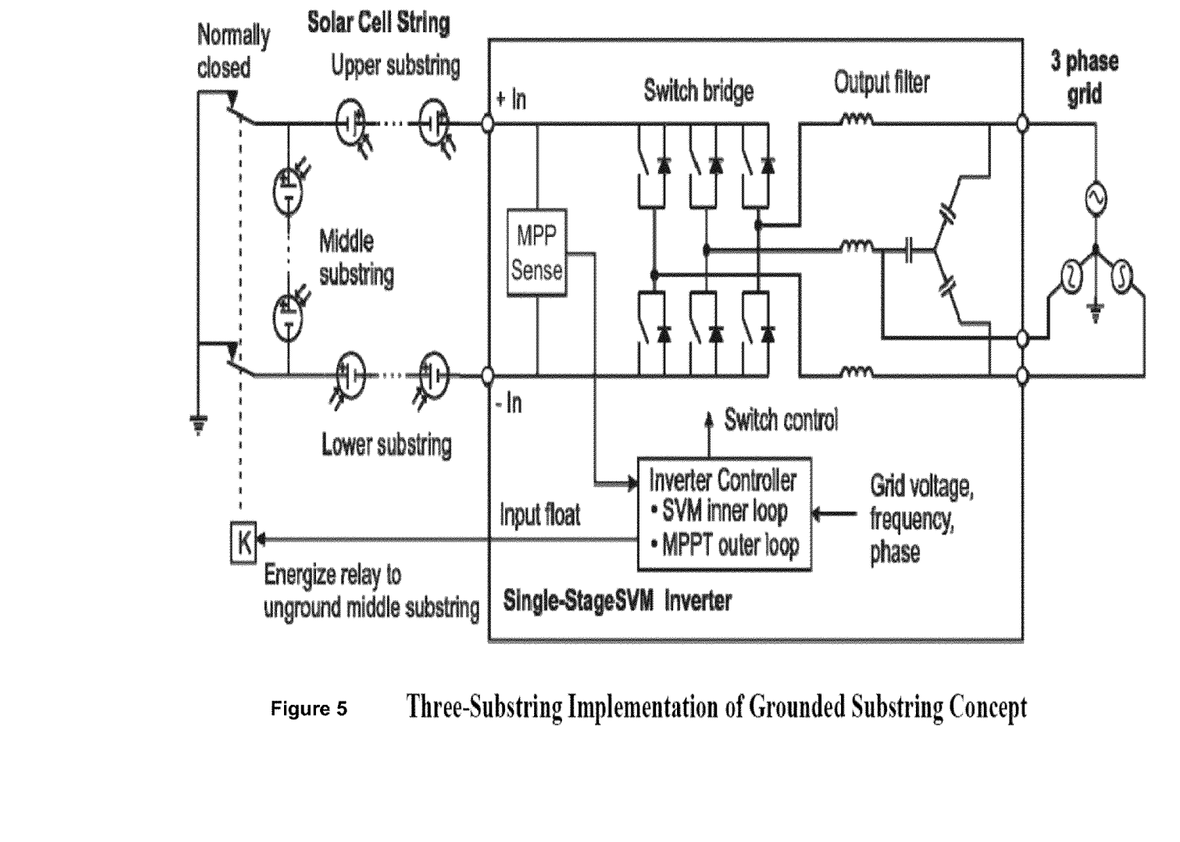
FIG. 5 illustrates a diagram of an embodiment of a method of solar cell string voltage management, used in conjunction with a single-stage SVM inverter.

FIG. 5 illustrates a diagram of an embodiment of a method of solar cell string voltage management, used in conjunction with a single-stage SVM inverter. In an embodiment, the three-substring implementation of a grounded substring is as follows.

The solar cell string is divided into a set of substrings. The ends of one or more substrings are connected to utility ground via normally-closed relay contacts when the inverter is not running. As illustrated here, there are three substrings labeled upper, middle, and lower, of which the middle substring is grounded via relay contacts. In the implementation proposed, the upper and lower substrings each comprise six modules (144 MJ GaAs cells in series), while the middle substring comprises three modules (72 such cells in series). In this arrangement, Voc (cold) for the upper and lower substrings is about 480 Vdc each, which is well within the +/−600 Vdc safety limit.

Alternatively, the string could be assembled from a larger number of cells for an overall Voc (cold) in excess of the safety limit (e.g. end-to-end voltage >1200 Vdc) and then arranged into various length substrings, one or more of which is grounded via normally-closed relay contacts such that no part of the string exceeds +/−600 Vdc with respect to ground. This would be advantageous for silicon solar cells or other types of solar cells having low fill factor. Say, for example, it is desired to operate a SVM inverter from a string of silicon cells such that Vmp (hot) is 900 Vdc, enabling conversion to 480 V grid power with good margin. Scaling from Table 1, the string would have a Voc (cold) of about 1200×(900/593)= 1821 Vdc. To conform to the safety limit, the string could be divided into substrings such that the upper and lower substrings have a Voc (cold) of say 580 Vdc and the middle substring has a Voc (cold) of 661 Vdc.

How the Technique Works

In some embodiments, when the inverter turns on, it loads the ungrounded substrings such that their voltage is pulled down to or below the anticipated Vmp for those substrings. The inverter controller then energizes the relay that ungrounds the ends of the middle substring, thereby presenting the full, loaded string voltage to the inverter input. The inverter then goes into regulated operation with the string at Vmp, and actively manages one sting endpoint voltage with respect to utility ground to maintain compliance with the +/−600 V safety limit over the length of the string.

The inverter controls switching such that the amount of current sourced to the grid loads the solar cell string at its maximum power point (MPP) over conforming grid voltages and also over varying solar cell illumination levels. When the power available from the solar cells falls below a specified minimum, the inverter re-grounds the middle string, turns off the power path, and monitors the remainder of the string for the resumption of adequate power. Also, if the inverter senses that the voltage at either of its inputs exceeds the safety limit, it re-grounds the middle string and turns off.

Advantages include one or more of the following:

Increased tolerance to poor illumination conditions and solar cell failures. For a given grid power form and solar cell type, the technique allows greater operating input voltage, Vmp, than would otherwise be available from the solar cell string. This improves system tolerance to panel shading, low early morning and late evening illumination levels, and solar cell failures.

Standardized inverter design accommodates various solar cell types and grid power forms. The technique allows an inverter of some standardized design to be used with a wide variety of solar cells having different fill factors, while operating into a wider range of grid power voltages. The ability to standardize an inverter design for a wide range of applications reduces inverter development cost and risk, and reduces recurring manufacturing cost.

Use of lower cost inverter parts with lower voltage rating. The ability to reduce the string Voc to which the inverter input is exposed allows the inverter to be implemented with lower voltage-rated parts. For example, the substring grounding scheme described above applies only 12/15 of full string Voc (cold) to the inverter at startup, or some 960 V. When loaded, the entire string will present a maximum voltage, Vmp (cold) of some 996 V. This allows the use of 1200 V switching devices that are derated to 1000 V for improved reliability margin. Minimal impact on inverter complexity. Since the basic single-stage SVM inverter is designed to operate a relay to unground the midpoint of the solar cell string, implementing the substring grounding method of the disclosed technique has minimal impact on inverter design and negligible impact on recurring cost. As stated above, the technique applies to the grounding of a single substring or to multiple substrings of solar cells.

Figure 7:
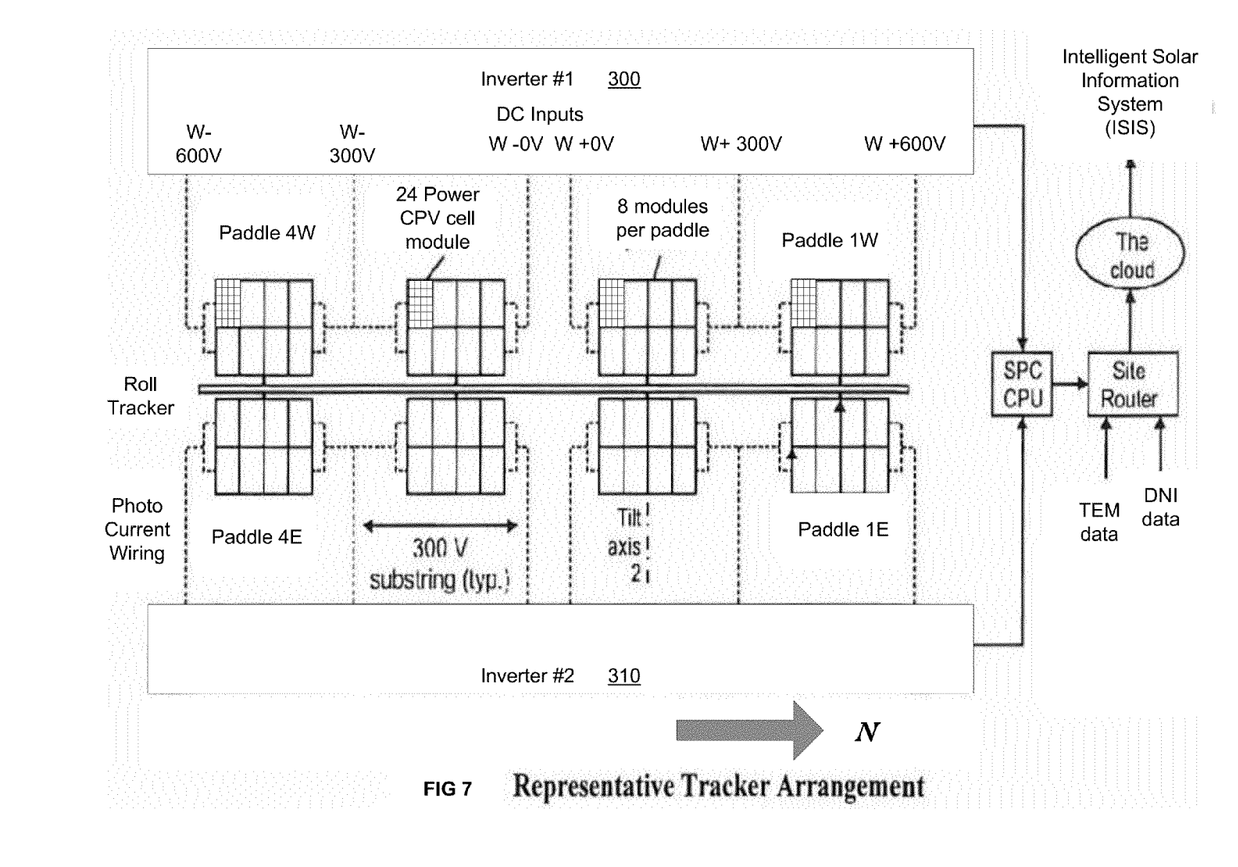
FIG. 7 illustrates a diagram of an embodiment of the physical and electrical arrangement of modules in a representative tracker unit.

FIG. 7 illustrates a diagram of an embodiment of the physical and electrical arrangement of modules in a representative tracker unit. Here, there are 24 power units per module, eight modules per paddle, two paddles per tilt axis, and four independently-controlled tilt axes per common roll axis. As discussed, the bi-polar voltage from the set of paddles may be, for example, a +600 VDC and a −600 VDC making a 1200 VDC output coming from the 16 PV modules. The 16 PV module array may be a string/row of PV cells arranged in an electrically series arrangement of two 300 VDC panels adding together to make the +600 VDC, along with two 300 VDC panels adding together to make the −600 VDC.

Although the foregoing embodiments have been described in some detail for purposes of clarity of understanding, the invention is not limited to the details provided. The Solar array may be organized into one or more paddle pairs. CPV modules on the West side and East side may supply different amounts of voltage or current. Functionality of circuit blocks may be implemented in hardware logic, active components including capacitors and inductors, resistors, and other similar electrical components. There are many alternative ways of implementing the invention. The disclosed embodiments are illustrative and not restrictive.

We claim:

1. An apparatus for a photovoltaic system, comprising:
a hybrid grounding circuit as well as a ground fault monitoring circuit in inverter circuitry with switching devices that are configured to generate three-phase Alternating Current (AC) voltage supplied to a utility power grid interface transformer, where a primary-side common node of the utility power grid interface transformer is connected to Earth ground, where the inverter circuitry includes at least a first inverter circuit and a second inverter circuit, where each inverter circuit has 1) its own set of isolation contacts to connect as well as isolate this particular inverter circuit from the utility grid interface transformer, and 2) control components in the ground fault monitoring circuit for controlling operation of the isolation contacts based off a presence of the ground fault detected by the ground fault monitor circuit for that inverter circuit, where the first inverter circuit receives a first DC voltage supplied from its own set of ungrounded PhotoVoltaic (PV) modules, where the second inverter circuit receives a second DC voltage supplied from its own set of ungrounded PV modules, where multiple solar arrays, each with their one or more inverter circuits, directly couple their three phase AC output to the same utility power grid interface transformer, where each inverter circuit in the grounded system has its own ground fault monitoring circuit, where the ground fault monitoring circuit detects the presence of the ground fault via a change in 1) voltage, 2) current or 3) both and the detection method occurs via a differential sense method, where in the hybrid grounding circuit when in operation producing AC, each inverter circuit gets referenced to 1) the primary-side common node of the utility power grid interface transformer which is connected to Earth ground during the operation of that inverter circuit and 2) referenced to Earth ground by a grounding switching device in an input circuit of that inverter circuit prior to the switching devices of the inverter circuit producing three phase AC power, and where the ground fault monitoring circuit is configured to detect PV array ground leakage before the isolation contacts of the first inverter circuit connect to the utility power grid interface transformer, which prevents disconnecting all of the inverter circuits in the entire system due to a ground fault on a single set of PV modules.

2. The apparatus for a photovoltaic system of claim 1, further comprising:
where the ground fault monitoring circuit is configured to detect the presence of the ground fault in the ungrounded PV modules that supply Direct Current (DC) power to grounded inverter circuit, where the first and second inverter circuits use Space Vector Modulated bridge switches, generating a nominal 480 V AC three phase power, that directly couple to the utility power grid transformer, without connection through an isolation transformer and then to the utility grid transformer, in where a neutral wire of the primary side of the utility power grid interface transformer is referenced to Earth ground.

3. The apparatus for a photovoltaic system of claim 1, where the isolation contacts and control components of the ground fault monitoring circuit are configured to prevent the 1) disconnection of an entire solar power generating system or 2) disconnection of an inverter group from the utility power grid interface transformer due to the ground fault occurring in an individual inverter circuit or its associated PV modules, by a localization of the ground fault to 1) a specific inverter circuit from an inverter group coupling to the utility grid power transformer or 2) even more specifically, a specific set of PV modules feeding a specific inverter circuit, which also reduce corrective maintenance costs.

4. The apparatus for a photovoltaic system of claim 1,
where the inverter circuitry receives a bipolar DC voltage supplied from its own set of PV modules,
where a switching device in the input circuit of each inverter circuit is used to create a common reference point for the positive VDC and the negative VDC inputs from the bipolar DC voltage of the PV array, and
where the ground fault monitoring circuit localizes of the ground fault to a specific set of PV modules feeding a specific inverter circuit by when the detected ground fault voltage has a negative voltage component, then the ground fault is coming from the set of PV modules supplying the negative DC voltage; and likewise when the detected ground fault voltage has a positive voltage component, then the ground fault is coming from the set of PV modules supplying the positive DC voltage.

5. The apparatus for a photovoltaic system of claim 1,
where the first inverter circuit receives a bipolar DC voltage supplied from its own set of PV modules, and
where the hybrid grounding circuit includes an input DC grounding circuit located in each inverter circuit that electrically couples to 1) a string of PV cells from a PV array and 2) the primary-side common node of the utility power grid interface transformer is connected to the Earth ground, where electrical components in the input DC grounding circuit include 1) one or more switching devices, one or more load resistors, and one or more over current devices to cause the DC power from that string of PV cells to be connected to the Earth ground when the first inverter circuit is not generating the three phase AC power out, and the electrical components in the input DC grounding circuit also includes 1) a contact 2) switch or 3) both to create a dynamic common zero Volts DC reference point for the bipolar DC voltage supplied to that inverter from its set of PV modules.

6. The apparatus for a photovoltaic system of claim 1, where the ground fault monitoring circuit contains a DC imbalance sensing circuit to assist in fault protection in determining which set of PV modules supplying power to the common utility grid transformer has a ground fault both 1) prior to inverter start up and 2) during the inverter circuit operation while producing the three phase AC voltage.

7. The apparatus for a photovoltaic system of claim 1, where the hybrid grounding circuit in the first inverter circuit uses relays to maintain its own set of ungrounded PV modules at a safe voltage while the first inverter circuit is disconnected from the utility grid interface transformer by connecting the first DC voltage supplied from the set of ungrounded PV modules feeding the first inverter circuit through a switching device to the Earth ground.

8. The apparatus for a photovoltaic system of claim 7, where the hybrid grounding circuit in the first inverter circuit couples the set of PV modules to an Earth Ground in the input circuit of the first inverter circuit through the switching device, a load resistor, and an over current device, and where the switching device may actuate, A) by electrically opening a contact or switch, B) electrically by closing a contact or switch, C) by the switching device starting to conduct, and D) by any combination of the three, to create an electrical path.

9. The apparatus for a photovoltaic system of claim 7, where the hybrid grounding circuit in the first inverter circuit has a DC common reference point control relay that actuates one or more contacts to create a common DC reference point for a bipolar DC voltage input from the ungrounded PV modules while the first inverter circuit is turned off, and also while an inverter logic is powered but the first inverter circuit is disconnected from the utility power grid and not operating, and when in these conditions, the inverter bridge switches are open, resulting in an electrical open circuit at each PV array pole, and consequently, no current flows in the PV solar array even if well-illuminated by sunlight because a complete ground path cannot be established, and
where an input of the ground fault monitoring circuit of each inverter circuit is equipped with a residual current monitor (RCM).

10. The apparatus for a photovoltaic system of claim 9, where the ground fault monitoring circuit detects when a ground leak occurs in the PV modules, a ground current will flow through the PV modules, ground fault resistance, a load resistor, a fuse, and the switching device completing the ground path between the normally ungrounded PV modules and Earth ground, and with the ground fault current flowing, the ground fault monitoring circuit can detect the presence of the ground fault on the ungrounded PV array, and in addition, when the fault current exceeds the fuse rating, then the fuse will open and interrupt the fault current; however, the voltage from the fault will now be sensed on an input legs of a voltage differential sense circuit.

11. The apparatus for a photovoltaic system of claim 10, where the ground fault monitoring circuit detects when the first inverter circuit is scheduled to put be on-line, the inverter controller is configured to interrogate the open fuse sense lines and when the inverter controller senses any voltage between the two open fuse sense lines, a fuse has opened, indicating a ground fault in the PV solar arrays, and the inverter controller keeps the inverter circuit off-line by keeping the isolation contacts open.

12. An apparatus for a photovoltaic system, comprising:
a hybrid grounding circuit as well as a ground fault monitoring circuit in inverter circuitry with switching devices that are configured to generate three-phase Alternating Current (AC) voltage supplied to a utility power grid interface transformer, where a primary-side common node of the utility power grid interface transformer is connected to Earth ground, where each inverter has 1) its own set of isolation contacts to connect as well as isolate this particular inverter from the utility grid interface transformer, and 2) control components in the ground fault monitoring circuit for controlling operation of the isolation contacts based off a presence of the ground fault detected by the ground fault monitor circuit for that inverter, where a first inverter circuit receives a DC voltage supplied from its own set of ungrounded PhotoVoltaic (PV) modules, where the ground fault monitoring circuit is configured when it detects no fuse failure, an inverter controller then puts the first inverter circuit on-line with the utility power grid by closing the isolation contacts, and also energizes a PV array DC common reference point control relay to interconnect and float DC voltage midpoints of a PV array, where a system ground is now established by the primary-side common node of the utility power grid interface transformer being connected to Earth ground, and a residual current monitor of the ground fault monitor circuit is now active and responsive to future PV array ground leaks, and when a ground occurs in the PV array coupled to the first inverter circuit, the ground fault is sensed by the residual current monitor, then the monitor is configured to cause an opening of the isolation contacts, and the PV array with the ground fault and the first inverter circuit are then isolated from the utility grid interface transformer but the transformer continues to receive AC voltage from any other inverter circuits coupling to that transformer and continues to produce power.

13. A method for grounding a photovoltaic system, comprising:

generating three-phase Alternating Current (AC) voltage supplied to a utility power grid interface transformer with inverter circuitry with switching devices, where a primary-side common node of the utility power grid interface transformer is connected to Earth ground, where the inverter circuitry includes at least a first inverter and a second inverter;

isolating each inverter with its own set of isolation contacts from the utility grid interface transformer;

using control components in a ground fault monitoring circuit for controlling operation of the isolation contacts based off a presence of a ground fault detected by the ground fault monitor circuit for that inverter, where the first inverter circuit receives a first DC voltage supplied from its own set of ungrounded PhotoVoltaic (PV) modules, where the second inverter circuit receives a second DC voltage supplied from its own set of ungrounded PV modules;

detecting PV array ground leakage before the isolation contacts of the first inverter circuit connect to the utility power grid interface transformer, which prevents disconnecting all of the inverter circuits in the entire system due to a ground fault on a single set of modules; and causing the ground fault monitoring circuit when it detects no fuse failure, to put the first inverter circuit on-line with the utility power grid by closing the isolation contacts, and also energizes a PV array DC common reference point control relay to interconnect and float DC voltage midpoints of a array, where a system ground is now established by the primary-side common node of the utility power grid interface transformer being connected to Earth ground, and a residual current monitor of the ground fault monitor circuit is now active and responsive to future array ground leaks, and when a ground occurs in the array, the ground fault is sensed by the residual current monitor, then the monitor is configured to cause an opening of the isolation contacts, and the specific array with the ground fault and its inverter circuit are then isolated from the utility grid interface transformer but the transformer continues to receive AC voltage from any other inverter circuits coupling to that transformer and continues to produce power.

14. The method for the photovoltaic system of claim 13, further comprising:

using relays to maintain a set of PV modules from a PV array at a safe voltage while the first inverter circuit is disconnected from the utility grid interface transformer by connecting the first DC output of the set of PV modules feeding the first inverter circuit through a switching device to the Earth ground.

15. The method for the photovoltaic system of claim 13, further comprising:

receiving a bipolar DC voltage supplied from its own set of PV modules in the first inverter circuit;

using an input DC grounding circuit located in each inverter circuit that electrically couples to 1) a string of PV cells from a PV array and the primary-side common node of the utility power grid interface transformer connected to the Earth ground; and causing the DC power from that string of PV cells to be connected to the Earth ground when the first inverter circuit is not generating the three phase AC power out with electrical components in the input DC grounding circuit selected from any of 1) one or more switching devices, one or more load resistors, and one or more over current devices, and the electrical components in the input DC grounding circuit also includes 1) a contact 2) switch or 3) both to create a dynamic common zero Volts DC reference point for the bipolar DC voltage supplied to that inverter from its set of PV modules.

* * * * *